(12) United States Patent
Kim et al.

(10) Patent No.: US 8,695,675 B2
(45) Date of Patent: Apr. 15, 2014

(54) CARGO SCREEN STRUCTURE

(75) Inventors: Jae Hwan Kim, Anyang-si (KR); Seong Hyeon Lee, Hwaseong-si (KR); Yong Chae Kim, Suwon-si (KR); Jae Yong Lee, Ansan-si (KR); Moon Gyu Park, Gwangmyeong-si (KR); Min Ho Cho, Daegu (KR); Sang Woo Park, Gunpo-si (KR); Eun Jeong Yang, Hwaseong-si (KR); Hyoung Shin, Hwaseong-si (KR); Ah Sal Moon, Hwaseong-si (KR); Jae Hak Joo, Hwaseong-si (KR); Jin Ho Hwang, Seoul (KR); Hak Song Lim, Ansan-si (KR); Eun Su Jang, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/535,092

(22) Filed: Jun. 27, 2012

(65) Prior Publication Data

US 2013/0146233 A1 Jun. 13, 2013

(30) Foreign Application Priority Data

Dec. 12, 2011 (KR) .................. 10-2011-0132967

(51) Int. Cl.
*G08B 13/08* (2006.01)

(52) U.S. Cl.
USPC ..................... 160/10; 160/370.22

(58) Field of Classification Search
USPC ......... 160/10, 370.22, 127, 1, 2, 7, 23.1, 133; 296/37.16, 97.8; 362/492, 503
See application file for complete search history.

(56) References Cited

U.S. PATENT DOCUMENTS

| | | | | |
|---|---|---|---|---|
| 2,870,831 A | * | 1/1959 | Peselnick | 160/120 |
| 2,894,578 A | * | 7/1959 | Caesar et al. | 160/308 |
| 4,807,684 A | * | 2/1989 | Melton | 160/23.1 |
| 4,896,136 A | * | 1/1990 | Hotovy | 340/468 |
| 5,148,849 A | * | 9/1992 | Faludy | 160/67 |
| 5,706,875 A | * | 1/1998 | Simon | 160/8 |
| 6,416,105 B2 | * | 7/2002 | Butz | 296/37.16 |
| 6,701,995 B1 | * | 3/2004 | Bogdanski | 160/127 |
| 6,877,548 B1 | * | 4/2005 | Chartier et al. | 160/178.1 V |
| 2008/0022596 A1 | * | 1/2008 | Boerger et al. | 49/31 |
| 2012/0137585 A1 | * | 6/2012 | Brown et al. | 49/31 |

FOREIGN PATENT DOCUMENTS

| | | |
|---|---|---|
| JP | 1-134193 U | 9/1989 |
| KR | 10-1998-046862 | 9/1998 |
| KR | 1020070019145 A | 2/2007 |
| KR | 10-0774714 B1 | 11/2007 |
| KR | 10-0946518 B1 | 3/2010 |

* cited by examiner

*Primary Examiner* — David Purol
(74) *Attorney, Agent, or Firm* — Morgan, Lewis & Bockius LLP

(57) ABSTRACT

A cargo screen structure may include a housing mounted at an upper portion of a vehicle luggage room in a horizontal direction, a shaft rotatably provided in the housing, a screen provided on an outer peripheral surface of the shaft and wound and unwound from the housing, and a switch provided in the housing and set to be turned on/off according to a winding amount of the screen around the outer peripheral surface of the shaft.

5 Claims, 5 Drawing Sheets

CARGO SCREEN STRUCTURE

CROSS-REFERENCE TO RELATED APPLICATION

The present application claims priority to Korean Patent Application No. 10-2011-0132967, filed on Dec. 12, 2011 in the Korean Intellectual Property Office, the entire contents of which is incorporated herein for all purposes by this reference.

BACKGROUND OF THE INVENTION

1. Field of the Invention

The present invention relates to a cargo screen structure, and more particularly, to a cargo screen structure capable of adjusting a switch according to whether or not a cargo screen is used.

2. Description of Related Art

In general, a leisure vehicle capable of loading many cargos therein has been widely popularized. The leisure vehicle includes a cargo screen provided between a rear seat and a rear door thereof in order to make a cargo space clean in view of an appearance and open and close a luggage room.

This cargo screen may be installed with a lighting device in order to improve utilization thereof. However, since the cargo screen according to the related art serves as a cover of a luggage compartment, even though the cargo screen is installed with the lighting device, it has the following problems.

As shown in FIGS. 1A and 1B, in the case of using the cargo screen (an unwound state), the cargo screen screens the lighting device on a ceiling, such that a cargo space becomes dark, and in the case of not using the cargo screen (a wound state), the cargo space becomes bright due to the lighting device on the ceiling. Therefore, the lighting device installed on the ceiling becomes useless in the case of the using the cargo screen. As an alternative for overcoming this problem, an additional lighting device A may be installed on one side portion of an internal trim part as shown in FIG. 1B. However, since the cargo screen is an option component selected according to a customer's taste and may also be attached and detached at any time, the additional lighting device is wasteful when the cargo screen is not present, and is also not efficient since it is disposed at a side. Therefore, a lighting device is installed directly at a lower side of the cargo screen to meet requirements.

Meanwhile, as shown in FIG. 2, the lighting device may also be attached to the lower side of the cargo screen. In the case of including a separate switch, there is an advantage in that a user may use the lighting device by operating the switch at any time if desired. However, there is a trouble that the user should turn on and turn off the lighting device whenever needed and there is a risk that a battery will be discharged if the user drives the vehicle in a state in which the lighting device is carelessly turned on.

Further, in the case in which the lower side of the cargo screen is filled with the cargo, it is difficult for a hand to approach a place at which the switch is present, and in the case of a switch interlocking with a door of a tail gate, a trouble that the switch is directly operated may be avoided. However, the lighting device may be continuously turned on unnecessarily even in the case in which the cargo screen is not actually used due to the absence of the cargo (a wound state).

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cargo screen structure capable of automatically turning on/off a lighting device according to whether or not a cargo screen is used.

In one aspect of the present invention, a cargo screen structure may include a housing mounted at an upper portion of a vehicle luggage room in a horizontal direction, a shaft rotatably provided in the housing, a screen provided on an outer peripheral surface of the shaft and wound and unwound from the housing, and a switch provided in the housing and set to be turned on/off according to a winding amount of the screen around the outer peripheral surface of the shaft.

The switch turns on while the winding amount of the screen decreases below a predetermined amount and turns off while the winding amount of the screen increases beyond the predetermined amount.

The switch is pivotally coupled to the housing and elastically biased toward the shaft.

The switch is pivoted around a hinge axis formed in the housing.

The cargo screen structure may further include an elastic body provided between the switch and the hinge axis to elastically support the switch from the hinge axis.

The cargo screen structure may further include a light source electrically-connected to the switch.

The light source is spaced apart from the switch.

The cargo screen structure may further include a lens provided at an outer side of the housing and allowing light emitted from the light source to be irradiated to the outside of the housing.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
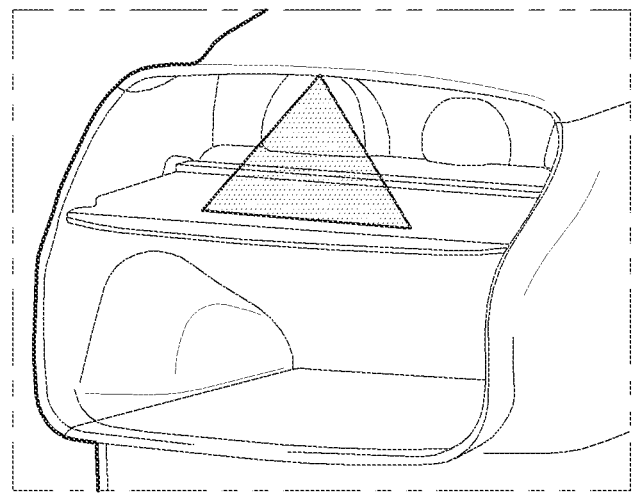
FIGS. 1A and 1B are views showing an example in which a lighting device is mounted on an upper portion in a lighting structure of a cargo screen according to the related art.
Figure 1B:
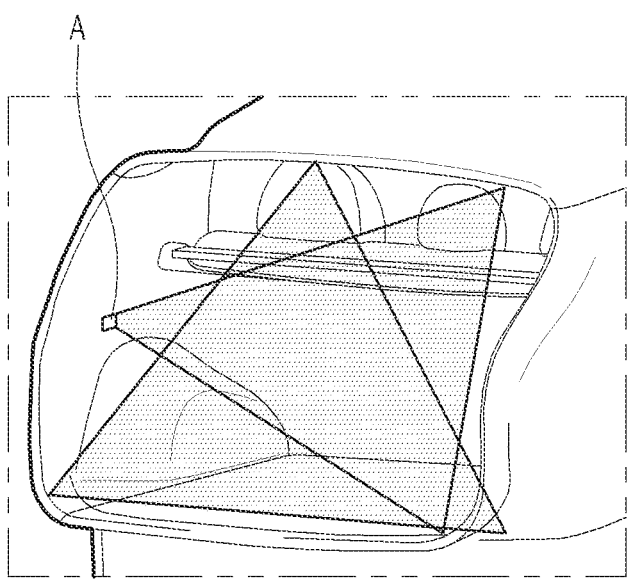
Figure 2:
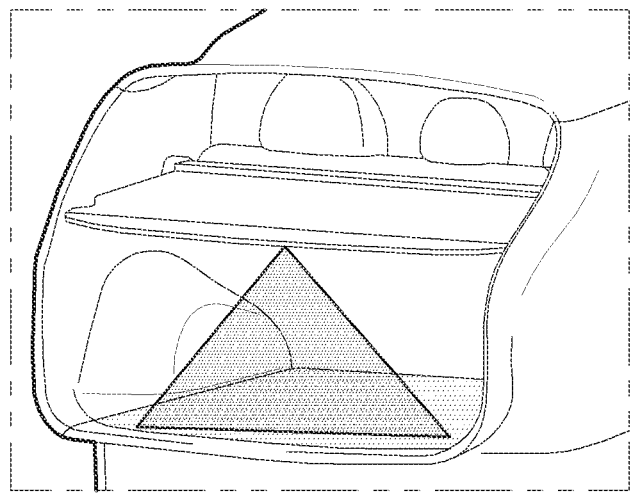
FIG. 2 is a view showing an example in which a lighting device is mounted on a lower portion in a lighting structure of a cargo screen according to the related art.
Figure 3:
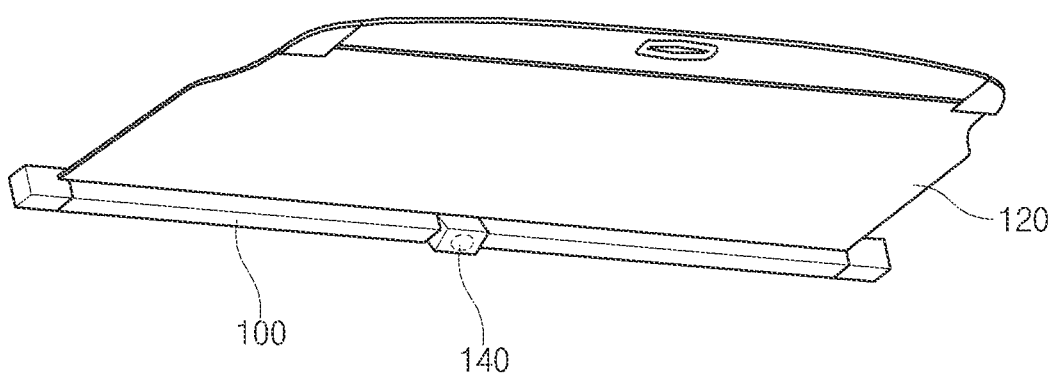
FIG. 3 is a view showing a cargo screen structure according to an exemplary embodiment of the present invention.
Figure 4:
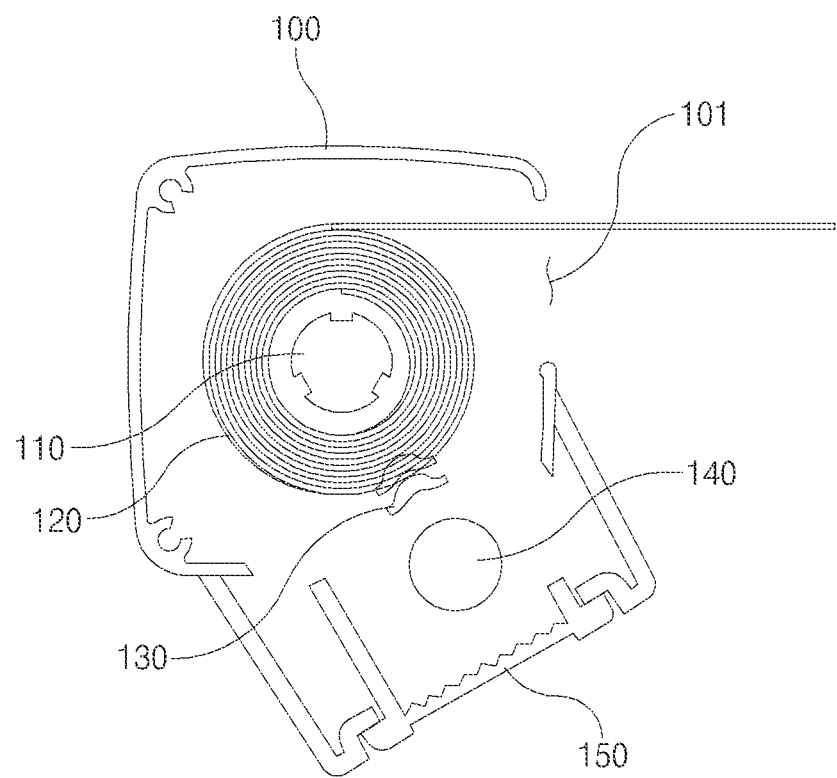
FIG. 4 is a cross-sectional view showing the cargo screen structure according to the exemplary embodiment of the present invention.
Figure 5:
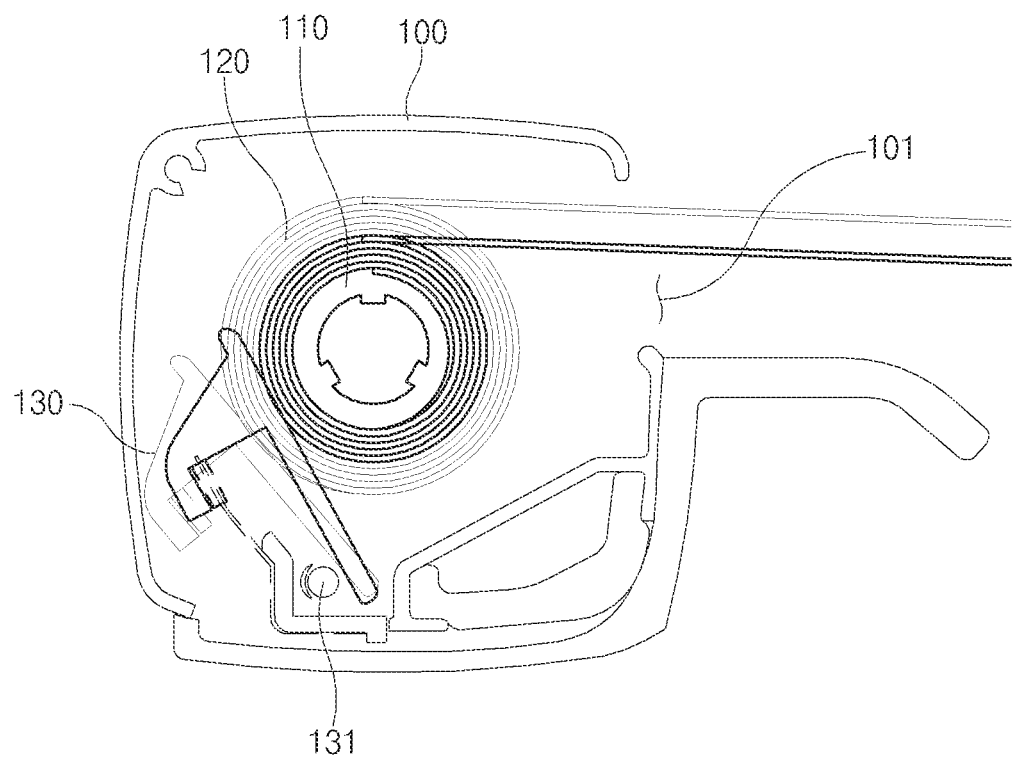
FIG. 5 is a cross-sectional view showing a cargo screen structure according to another exemplary embodiment of the present invention.

FIGS. 3 to 5 are views showing a cargo screen structure according to an exemplary embodiment of the present invention, wherein FIG. 3 is a view showing a cargo screen structure according to an exemplary embodiment of the present invention. FIG. 4 is a cross-sectional view showing the cargo screen structure according to the exemplary embodiment of the present invention. FIG. 5 is a cross-sectional view showing a cargo screen structure according to another exemplary embodiment of the present invention.

Exemplary embodiments of the present invention will be described in detail with reference to the accompanying drawings.

A cargo screen structure according to an exemplary embodiment of the present invention is configured to include a housing 100 mounted in a vehicle luggage room, a shaft 110 provided in the housing 100, a screen 120 provided on an outer peripheral surface of the shaft 110, and a switch 130 set to be turned on/off according to a winding amount according to winding and unwinding of the screen 120, as shown in FIGS. 3 to 5, thereby controlling the switch according to an operation of a cargo screen.

Hereinafter, each component of the cargo screen structure according to the exemplary embodiment of the present invention will be described with reference to the accompanying drawings.

First, according to the exemplary embodiment of the present invention, as shown in FIGS. 3 and 4, a cargo screen including the housing 100, the shaft 110, and the screen 120 and mounted in the vehicle luggage room is provided, and the switch 130 is mounted in the housing 100 of the cargo screen.

The housing 100 has a pipe shape in which it include a hollow formed therein and is mounted at an upper portion of the vehicle luggage room (at a height of a rear seat) in a horizontal direction.

Here, the housing 100 may have a circular pipe shape or a rectangular pipe shape.

The shaft 110, which is provided in the housing 110, has a pipe shape and is rotatable to enable a screen 120 to be described below to be wound and unwound.

The screen 120 is provided on the outer peripheral surface of the shaft 110 and is wound and unwound from the housing 100.

Here, one side of the housing 100 may be formed with an input and output hole 101 so that the screen 120 may be wound and unwound from the housing 100.

In this configuration, when the screen 120 is wound, the screen 120 is wound around the outer peripheral surface of the shaft 110 while being rolled to the inside of the housing 100, such that a winding amount increases, and when the screen 120 is unwound, the screen 120 is unrolled to the outside of the housing 100, such that a winding amount on the outer peripheral surface of the shaft 110 decreases.

The switch 130 is provided in the housing 100, measures the winding amount of the screen 120 wound around the outer peripheral surface of the shaft 110, and is set to be turned on/off according to the winding amount of the screen 120.

Here, the setting of the turn-on/off of the switch 130 according to the winding amount of the screen 120 is in accordance with a rotational angle of the switch 130. When the winding amount of the screen 120 wound around the shaft 110 increases due to the winding of the screen 120, it corresponds to a case in which the cargo screen is not used, such that power of the switch 130 is turned off, and when the winding amount of the screen 120 wound around the shaft 110 decreases due to the unwinding of the screen 120, it corresponds to a case in which the cargo screen is used, such that power of the switch 130 is turned on.

Here, the switch 130 may be basically pivoted around a hinge axis 131 formed in the housing 100, and an elastic body may be additionally provided between the switch 130 and the hinge axis 131 to elastically support the switch 130 from the hinge axis 131.

A light source 140, which is a unit emitting light, interlocks with the switch 130, such that light of the light source 140 may be emitted and blocked according to turn-on/off of the switch 130 by the winding amount of the screen 120.

The lens 150 may be provided in the housing 100 to allow light emitted from the light source 140 to be irradiated to the outside.

Meanwhile, the light source 140 may interlock with the switch 130 and be disposed to be spaced apart from the switch 130. Therefore, as shown in FIG. 5, at the time of operating the switch 130 according to the winding and the unwinding of the screen 120, a turn-on/off state of the switch 130 is transferred to the light source 140, thereby making it possible to emit light from the light source 140 provided at a position spaced apart from the switch 130.

According to the exemplary embodiment of the present invention in which a lighting device is installed on a lower surface of the cargo screen at an appropriate angle, the switch 130 including the elastics body and the hinge axis 131 formed to the housing 100. The switch 130 is pivotally coupled to the hinge axis 131 and detects a change in length of an outer diameter of the shaft 110 around which the screen 120 is wound and is turned on/off according to a detection result, thereby making it possible to selectively emit light through the light source 140 interlocking with the switch 130.

The cargo screen structure according to the exemplary embodiment of the present invention configured as described above is configured to include the housing mounted at an upper portion of the vehicle luggage room in the horizontal direction, the shaft rotatably provided in the housing, the screen provided on the outer peripheral surface of the shaft and wound and unwound from the housing, and the switch provided in the housing and set to be turned on/off according to the winding amount according to the winding and the unwinding of the screen wound around the outer peripheral surface of the shaft. Therefore, the switch is controlled according to the operation of the cargo screen to automatically turn on/off the lighting device, thereby making it possible to improve convenience for a user, and discharge of a battery due to careless turn-on of the lighting device is prevented, thereby making it possible to improve marketability.

As set forth above, according to the exemplary embodiment of the present invention, the switch is controlled according to the operation of the cargo screen, thereby making it possible to improve convenience for a user, and the lighting device of the cargo screen is automatically turned on through the control of the switch to prevent discharge of the battery due to turn-on of the lighting device, thereby making it possible to improve marketability.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cargo screen structure comprising:
    a housing mounted at an upper portion of a vehicle luggage room in a horizontal direction;
    a shaft rotatably provided in the housing;
    a screen provided on an outer peripheral surface of the shaft and wound and unwound from the housing; and
    a switch provided in the housing and set to be turned on/off according to a winding amount of the screen around the outer peripheral surface of the shaft;
    wherein the switch is pivotally coupled to the housing and elastically biased toward the shaft;
    wherein the switch is pivoted around a hinge axis formed in the housing; and
    wherein an elastic body is provided between the switch and the hinge axis to elastically support the switch from the hinge axis.

2. The cargo screen structure according to claim 1, wherein the switch turns on while the winding amount of the screen decreases below a predetermined amount and turns off while the winding amount of the screen increases beyond the predetermined amount.

3. The cargo screen structure according to claim 1, further comprising a light source electrically-connected to the switch.

4. The cargo screen structure according to claim 3, wherein the light source is spaced apart from the switch.

5. The cargo screen structure according to claim 3, further including a lens provided at an outer side of the housing and allowing light emitted from the light source to be irradiated to the outside of the housing.

* * * * *